(12) United States Patent
Shelton et al.

(10) Patent No.: US 6,875,248 B1
(45) Date of Patent: Apr. 5, 2005

(54) DUST COLLECTION CABINET

(75) Inventors: Angela Denise Shelton, Jackson, TN (US); Leslie Daily Gist, Jackson, TN (US)

(73) Assignee: Delta International Machinery Corp., Jackson, TN (US)

( * ) Notice: Subject to any disclaimer, the term of this patent is extended or adjusted under 35 U.S.C. 154(b) by 7 days.

(21) Appl. No.: 10/254,711

(22) Filed: Sep. 25, 2002

(51) Int. Cl.[7] .......................... B01D 29/27; B01D 46/02
(52) U.S. Cl. .......................... 55/356; 55/341.1; 55/378; 55/385.1; 55/429; 55/467; 55/DIG. 18
(58) Field of Search ................... 55/323, 341.1, 55/341.5, 356, 361, 378, 385.1, 428, 429, 467, DIG. 18, DIG. 29

(56) References Cited

U.S. PATENT DOCUMENTS

| | | | | |
|---|---|---|---|---|
| 1,267,091 A | * | 5/1918 | Leiman et al. ............... 96/329 |
| 1,776,777 A | * | 9/1930 | Bragstad ..................... 55/314 |
| 2,341,628 A | * | 2/1944 | Koweindl ..................... 454/49 |
| 3,120,432 A | * | 2/1964 | Aldrich ....................... 55/315 |
| 3,387,433 A | * | 6/1968 | Mackey ....................... 55/356 |
| 3,391,689 A | * | 7/1968 | Roger ...................... 126/299 R |
| 3,653,190 A | * | 4/1972 | Lee et al. ..................... 55/302 |
| 3,686,836 A | * | 8/1972 | Rabilloud et al. ............. 55/467 |
| 3,880,061 A | * | 4/1975 | Hensiek et al. ............... 454/66 |
| 4,092,136 A | * | 5/1978 | Zimbardi ..................... 96/399 |
| 4,201,256 A | * | 5/1980 | Truhan ..................... 144/252.2 |
| 4,227,902 A | * | 10/1980 | Olson ......................... 55/302 |
| 4,248,162 A | * | 2/1981 | Skeist ....................... 108/50.13 |
| 4,268,282 A | * | 5/1981 | MacKenzie .................... 96/58 |
| 4,375,712 A | * | 3/1983 | Kato et al. .................... 16/282 |
| 4,531,956 A | * | 7/1985 | Howorth ...................... 96/223 |
| 4,624,690 A | * | 11/1986 | Byrnes ...................... 55/385.1 |
| 4,647,295 A | * | 3/1987 | Christ ......................... 95/284 |
| 4,715,872 A | * | 12/1987 | Snyder ........................ 55/315 |
| 4,917,712 A | * | 4/1990 | Crigler ........................ 95/280 |
| 5,083,558 A | * | 1/1992 | Thomas et al. ............ 128/202.12 |
| 5,131,192 A | * | 7/1992 | Cheng ........................ 451/456 |
| 5,139,546 A | * | 8/1992 | Novobilski .................... 96/142 |
| 5,160,517 A | * | 11/1992 | Hicks et al. .................. 55/385.1 |
| 5,163,985 A | * | 11/1992 | Chen ......................... 55/356 |
| 5,230,720 A | * | 7/1993 | Kendall ........................ 96/19 |
| 5,230,723 A | * | 7/1993 | Travis et al. .................... 96/57 |
| 5,240,478 A | * | 8/1993 | Messina ...................... 95/273 |
| 5,441,279 A | * | 8/1995 | Messina ...................... 273/309 |
| 5,511,764 A | * | 4/1996 | Wonsetler .................... 266/49 |
| 5,558,112 A | * | 9/1996 | Strieter ..................... 134/103.2 |
| 5,593,470 A | * | 1/1997 | Shagott et al. ................ 96/418 |
| 5,688,297 A | * | 11/1997 | Spengler ...................... 55/356 |
| 5,853,441 A | * | 12/1998 | Groen et al. ................. 55/350.1 |
| 5,904,755 A | * | 5/1999 | Kanazashi et al. ............. 96/55 |
| 5,984,990 A | * | 11/1999 | McDonald .................. 55/385.1 |
| 6,036,736 A | * | 3/2000 | Wallace et al. .............. 55/385.2 |
| 6,221,135 B1 | * | 4/2001 | Wirth et al. ................... 95/273 |
| 6,383,242 B1 | * | 5/2002 | Rogers et al. ............... 55/385.2 |
| 6,432,173 B1 | * | 8/2002 | Johnson et al. ............... 95/269 |
| 6,444,002 B1 | * | 9/2002 | Mai .......................... 55/385.1 |
| 6,507,974 B1 | * | 1/2003 | Cheng ......................... 15/347 |
| 6,623,538 B2 | * | 9/2003 | Thakur et al. .............. 55/385.2 |
| 2003/0140795 A1 | * | 7/2003 | Rerucha ...................... 96/233 |

FOREIGN PATENT DOCUMENTS

JP          05-38412 F1    *    2/1993

* cited by examiner

Primary Examiner—Robert H. Spitzer
(74) Attorney, Agent, or Firm—Suiter West PC LLO

(57) ABSTRACT

A dust collection cabinet is provided, which includes a cabinet and a dust collection device. The cabinet provides a storage facility for work tools and other accessories. The dust collection device includes a housing disposed with a motor, an on/off switch, an inlet gate and an outlet gate. The dust collection device further includes a storage facility for the collected dust and a support apparatus. A platform provides the base of the dust collection cabinet and includes casters to provide portability to the dust collection cabinet.

38 Claims, 8 Drawing Sheets

DUST COLLECTION CABINET

FIELD OF THE INVENTION

The present invention generally relates to the field of air filtration, and particularly to a dust collection cabinet capable of collecting dust, debris and other loose materials and providing an enclosure that may store tools, work clothes and the like.

BACKGROUND OF THE INVENTION

Woodworking shops deal with dust and other loose airborne materials on a daily basis. The cutting, sanding and shaping of wood products produce airborne particles that may cause harm to an operator who is unaware of the risk or not properly protected. These same risks exist for the craftsmen at home working in their workshop. Additionally, craftsmen utilize a wide variety of tools to accomplish woodworking tasks and have a need for a place to store and protect these valuable tools when not in use.

Modernly, craftsmen utilize two devices to accomplish these two goals. A dust collector is used to vacuum loose airborne particles as well as other dust and debris. These dust collectors provide vacuum hoses which, are used to directly suck up loose materials or often are attached to large workstations, such as table saws, and clear materials through a collection device. For tools, craftsmen, often utilize storage devices, such as tool boxes, tool storage cabinets and the like, to keep and protect the tools when not in use and provide easy access to the tools when needed. However, while both of these needs exist for craftsmen they are forced to purchase and utilize separate devices to accomplish the tasks.

Therefore, it would be desirable to provide a dust collection cabinet capable of vacuuming dust, debris and other generated loose material into a storage facility, as well as providing additional storage capabilities for tools, clothing and accessories.

SUMMARY OF THE INVENTION

Accordingly, the present invention is directed to a dust collection cabinet capable of vacuuming dust, debris and other generated loose material into a storage facility and providing additional storage capabilities for tools, work clothes and accessories. The dust collection cabinet provides an operator the all in one solution to the problems of improved air quality and workplace cleanliness as well as where to place and store tools and any other accessories. By providing a dust collection device, the dust collection cabinet gives an operator the means by which to vacuum loose airborne particles as well as other debris, such as wood chips into storage facilities and out of the workplace. Further, by providing a cabinet, the dust collection cabinet gives an operator the functionality of tool and accessory storage.

In one aspect of the present invention a dust collection cabinet includes a dust collection device mounted on a cabinet which is mounted upon a platform. The dust collection device comprises a housing disposed with a motor, an inlet gate and an outlet gate, an on/off switch, a power cord and storage facilities connected to the housing and a support apparatus connected to the housing and the storage facilities. The support apparatus maintain the storage facilities in an open position. The storage facilities receive dust and debris through a connection with the outlet gate, which is connected to the inlet gates. Intake members are connected to the inlet gates to directly vacuum up dust and debris. The cabinet includes a shelf and drawer for storing tools, clothing, accessories and any other materials, however, it is contemplated that the cabinet may include a plurality of shelves and drawers in any of a variety of combinations.

In another aspect of the present invention a dust collection cabinet includes a dust collection device mounted on a cabinet which is mounted upon a platform. The dust collection device comprises a housing disposed with a motor, inlet and outlet gates, an on/off switch, a power cord and multiple storage facilities connected to the housing and multiple support apparatus connected to the housing and the multiple storage facilities. The multiple support apparatus maintain the multiple storage facilities in an open position. The storage facilities receive dust and debris through connection with the outlet gates, which is connected to the inlet gates. Intake members are connected to the inlet gates to directly vacuum up dust and debris. The cabinet includes a plurality of drawers and shelves and while shown centered on the platform may be located at either end of the platform.

In a third aspect of the present invention a dust collection cabinet includes a dust collection device mounted on a cabinet and a storage closet. The dust collection device comprises a housing disposed with a motor, a plurality of inlet and outlet gates, one or more on/off switches and a power cord. A plurality of storage facilities are coupled to the one or more outlet gates. The plurality of storage facilities are disposed within the storage closet, that includes a door allowing access to the plurality of storage facilities. The dust collection device may be disposed with a plurality of motors to increase effectiveness while the cabinet is disposed with a plurality of drawers and shelves.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Figure 1:
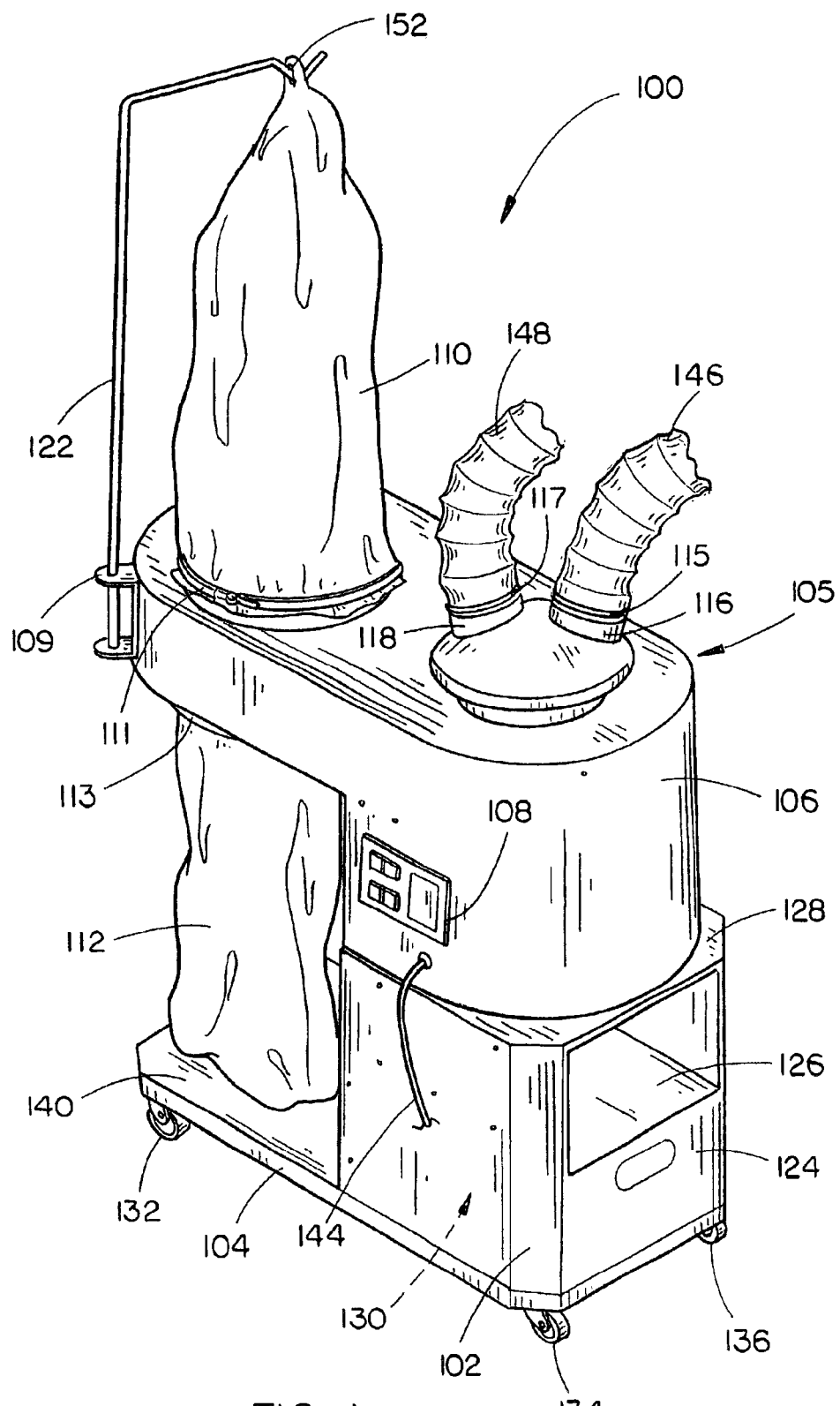
FIG. 1 is an isometric view illustrating a dust collection cabinet providing a cabinet, a dust collection device and a storage facility in accordance with an exemplary embodiment of the present invention.
Figure 2:
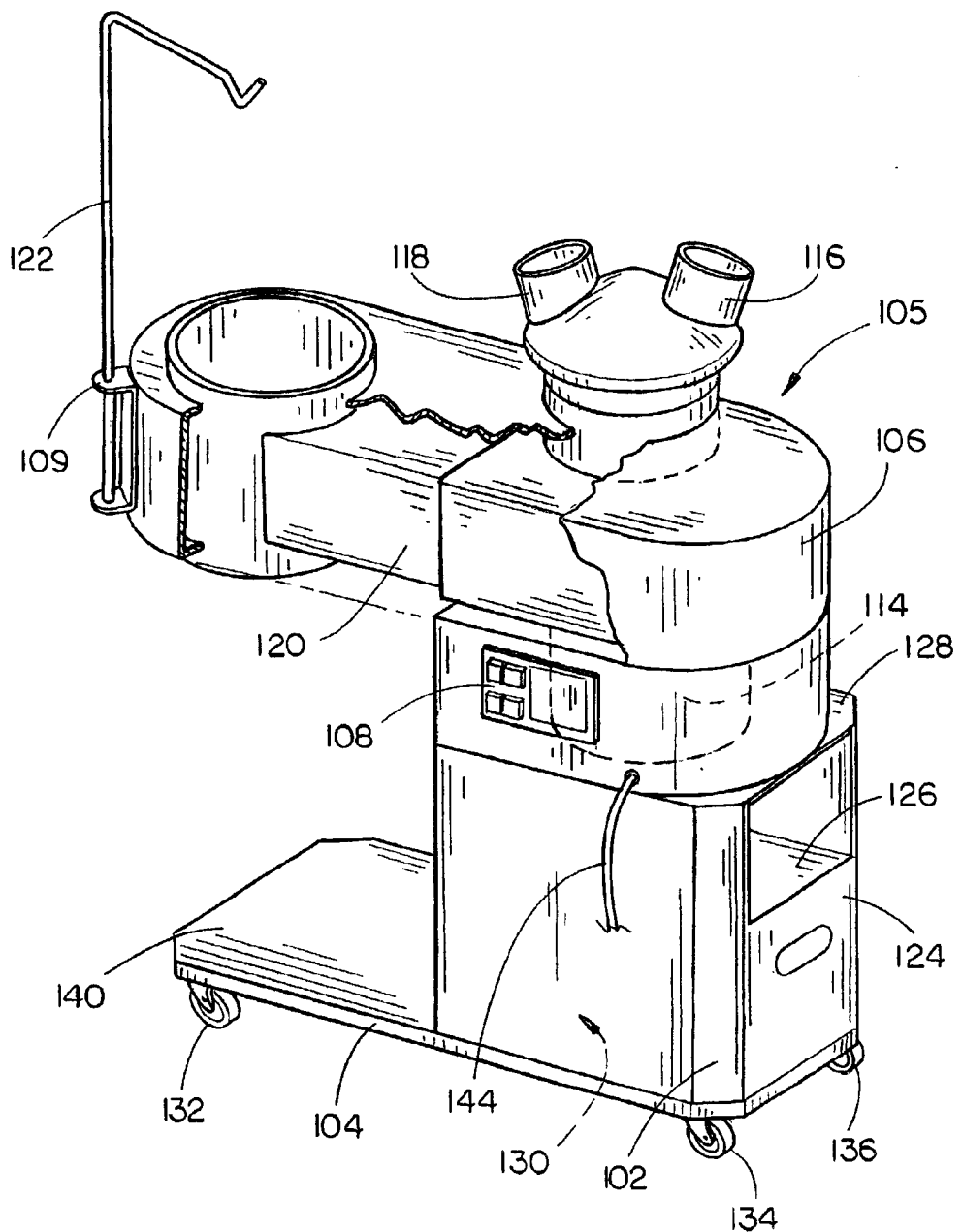
FIG. 2 is a cutaway isometric view illustrating the dust collection device of the dust collection cabinet in accordance with an exemplary embodiment of the present invention
Figure 3:
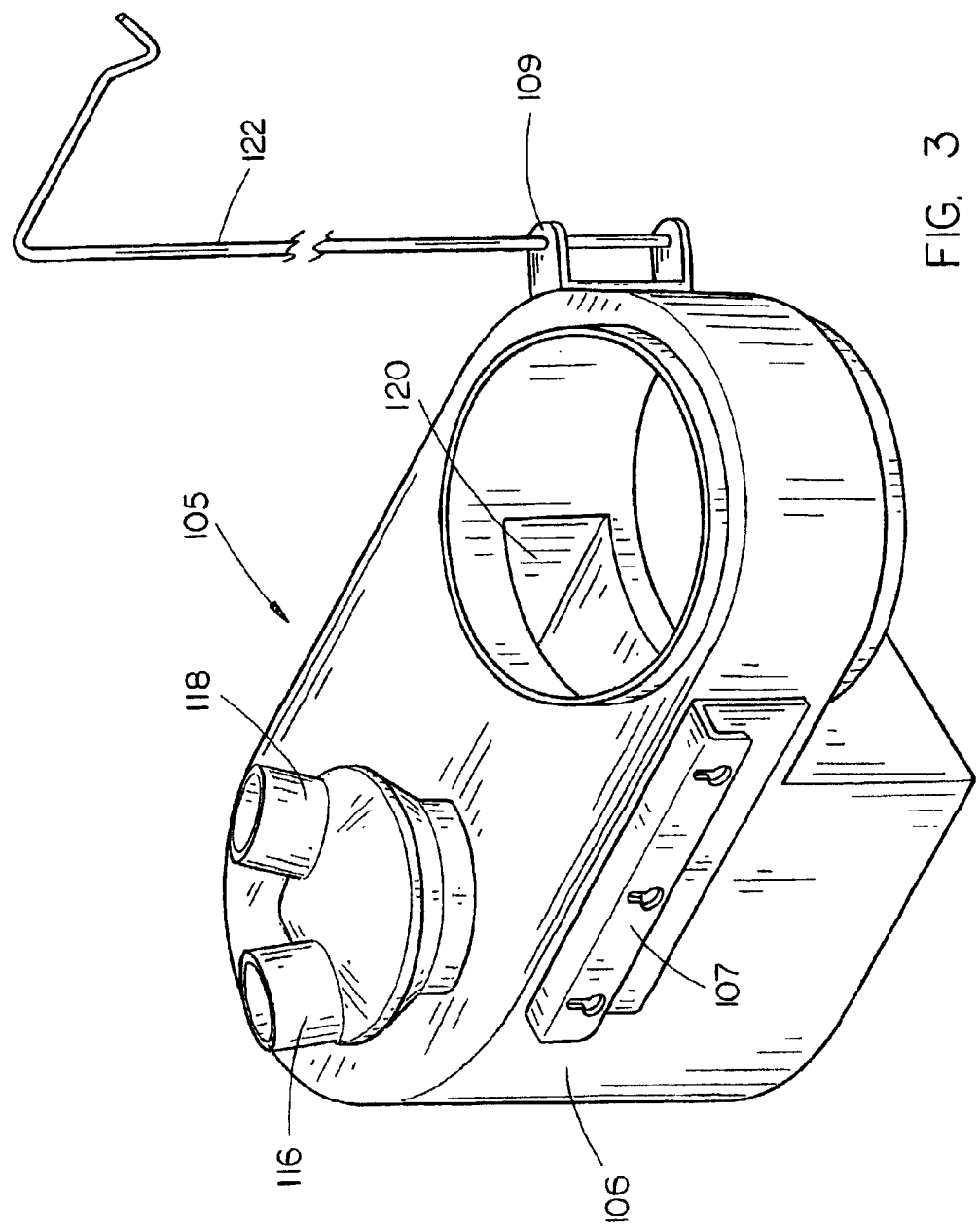
FIG. 3 is an isometric view of the dust collection device with mounting brackets independent of a cabinet.

Reference will now be made in detail to the presently preferred embodiments of the invention, examples of which are illustrated in the accompanying drawings.

Referring generally now to FIGS. 1 through 5, exemplary embodiments of the present invention are shown. A dust collection cabinet, generally designated by reference numeral 100, includes a cabinet 102 integrated with a platform 104. Mounted on cabinet 102 is a dust collection device 105. Dust collection device 105 includes a housing 106. Dust collection device housing 106 includes an on/off switch 108, a motor 114 connected to inlet gates 116 and 118 and outlet gate 120. Storage facilities 110 and 112 are connected to the dust collection device housing 106. Outlet gate 120 connects with storage facilities 110 and 112. A support apparatus 122 is mounted to dust collection device housing 106 and connects with storage facility 110.

Figure 4:
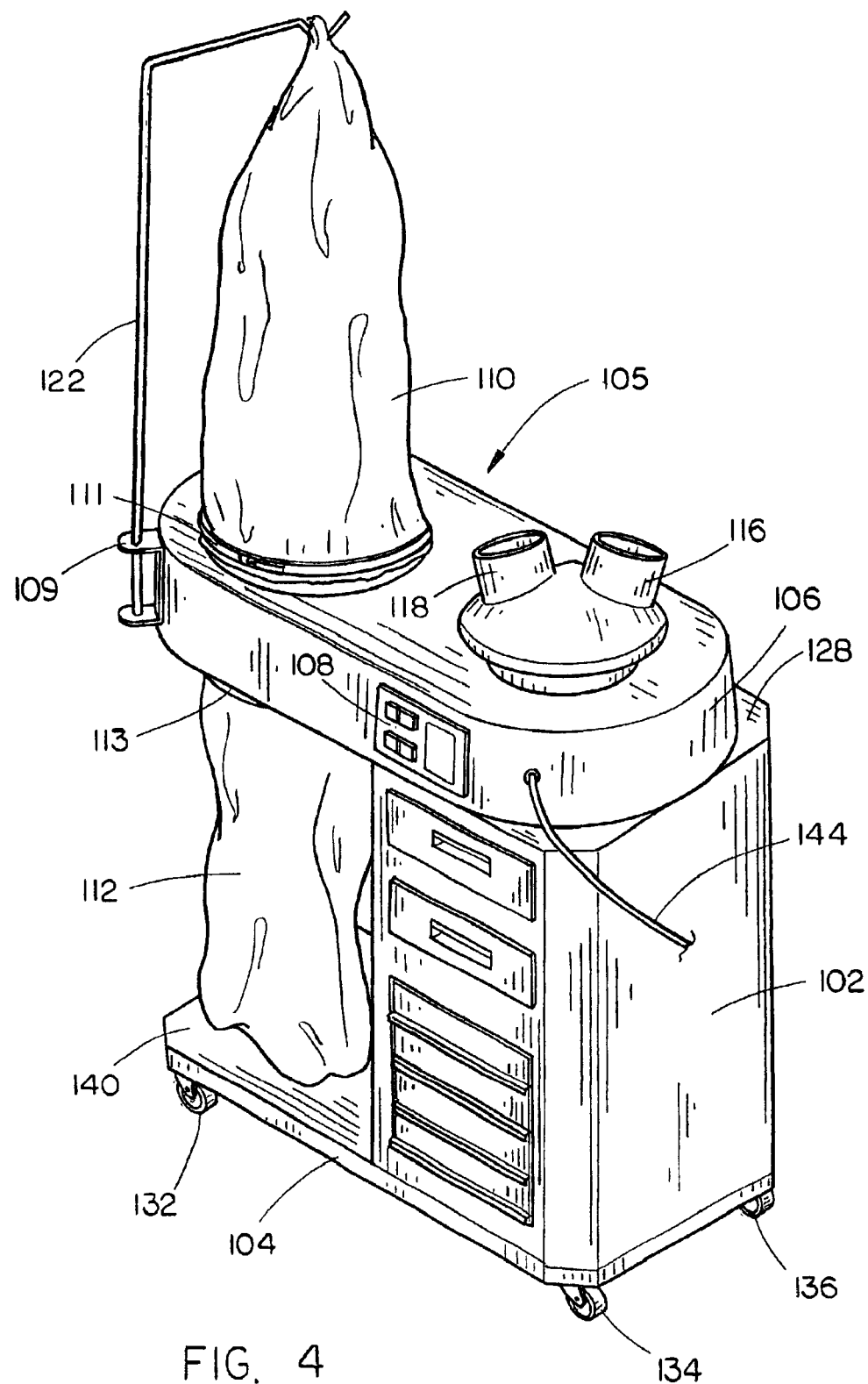
FIG. 4 is an isometric view illustrating an enlarged cabinet of the dust collection cabinet in accordance with an exemplary embodiment of the present invention.

In the embodiment shown cabinet 102 includes a drawer 124 and a shelf 126. However, cabinet 102 may include any number and combination of drawers and shelves (as shown in FIG. 4). It is understood that the number, location and size of the drawers and shelves may vary without departing from the scope and spirit of the present invention. The size of cabinet 102 may vary as contemplated by one of ordinary skill in the art. Further, one or more handles may be mounted upon cabinet 102.

Cabinet 102 is composed of steel, however, it may be composed of other metals such as aluminum and the like or other materials such as wood, fiberglass, plastic and the like. Cabinet 102 includes a top side 128 upon which dust collection device housing 106 is mounted. Cabinet 102 includes a bottom side 130, which is integrated with platform 104 in this exemplary embodiment. Cabinet 102 may be removably mounted upon a top side 140 of platform 104 and include mounting brackets attached to bottom side 130!: for coupling with platform 104.

Platform 104 includes casters 132, 134, 136 and 138. These casters are mounted on an underside of the platform 104 away from cabinet 102. Casters 132 through 138 may include locking mechanisms to lock the position of dust collection cabinet 100 in place. Platform 104 may have a mounting mechanism included on its underside enabling dust collection device 100 to be permanently locked in place. The casters may be other forms of devices such as wheels, rollers or the like.

Platform 104 extends out from its integration with cabinet 102 to provide a support surface for storage facilities 110 and 112. Platform 104 is composed of steel to provide rigid, durable support for dust collection cabinet 100. Platform 104 may be composed of other materials such as wood, fiberglass, plastic and the like or other metals such as aluminum and the like. As previously mentioned, platform 104 is integrated with cabinet 102, however, it is contemplated that platform 104 may have mounting brackets which allow cabinet 102 to be removably mounted on the platform. Thus, a wide variety of dust collection cabinets may be mounted on a single platform.

Dust collection device housing 106 is disposed with a motor 114, which provides the vacuum suction through inlet gates 116 and 118. Motor 114 is controlled by on/off switch 108 and is connected to a power source through power cord 144. On/off switch 108 is a two-position switch, allowing a user to control the functioning of motor 114. On/off switch 108 may be enabled with a removable lockout key.

Inlet gates 116 and 118 connect with intake members (vacuum hoses) 146 and 148 and may be closed when motor 114 is not in use for operator safety. Connectors 115 and 117 secure intake members 146 and 148 to inlet gates 116 and 118, respectively. Connectors 115 and 117 are compression fasteners, however, may be any variety of connector, fastener and the like without departing from the scope and spirit of the present invention. A dust hood may be connected to the end of intake members 146 or 148 for capturing chips and other debris. Motor 114 sends the dust, debris and loose material collected, from intake members 146 and 148, through outlet gate 120 to storage facilities 110 and 112. An impeller may be disposed within one side of housing 106. The impeller aids in reducing noise levels generated while the dust collection device is in operation.

Dust collection device housing 106 is mounted on cabinet 102. Dust collection device housing 106 may be modular and removable from cabinet 102. Further, dust collection device housing 106 may include a mounting bracket 107, which allows it to be mounted to a wall or other suitable object. The size of dust collection device housing 106 may vary as contemplated by one of ordinary skill in the art. Additional switches may be added to dust collection device housing 106 to provide enhanced user control over the functioning of motor 114 disposed within dust collection device housing 106. Motor 114 may vary in size and horsepower to provide greater vacuuming power.

Figure 5:
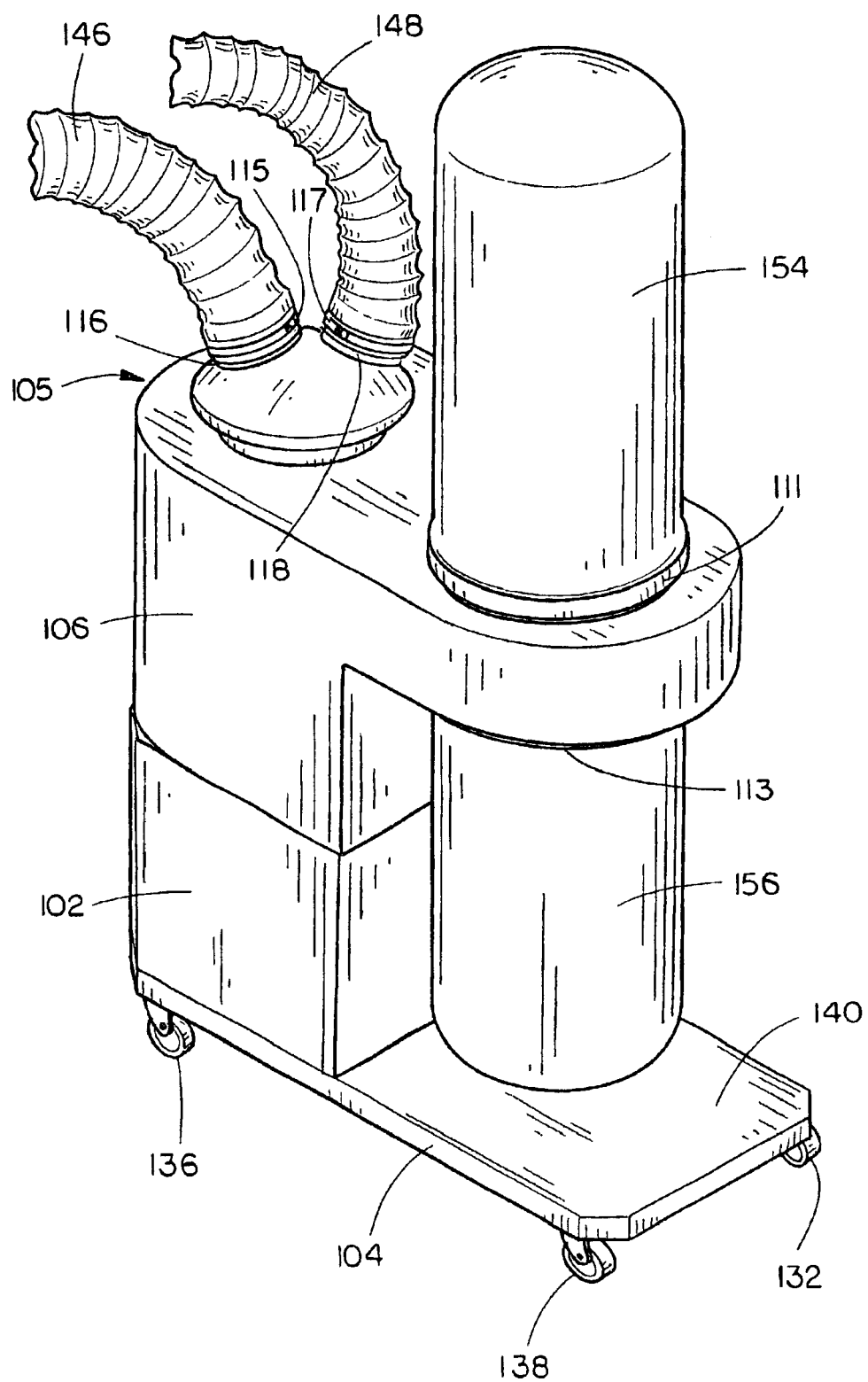
FIG. 5 is an isometric view illustrating the dust collection cabinet providing the storage facility as dust cans in accordance with an exemplary embodiment of the present invention.

Storage facilities 110 and 112 are dust collection bags. Each bag fastens to dust collection device housing 106 and is fed from outlet gate 120. Each dust collection bag includes an eye loop 152. The method of fastening each dust collection bag is by use of fasteners 111 and 113, which are compression fasteners. Fasteners 111 and 113 may vary as contemplated by one of ordinary skill in the art without departing from the scope and spirit of the present invention. Alternately, storage facilities 110 and 112 may be one or more dust cans 154 and 156 (as shown in FIG. 5) or other similar collection devices as may be contemplated by one of ordinary skill in the art. Such dust cans may seat on platform 104 for support and may not require support apparatus 122. A support structure may be mounted on platform 104 to provide structural support to dust collection cabinet 100. The dust cans may be circumferentially threaded in order to allow connection with dust collection device 106, however, other means, such as, fasteners and the like, may be employed to connect the dust cans to dust collection device housing 106.

Support apparatus 122 is a metal rod connected, at one end, to dust collection device housing 106 by mounting bracket 109. Support apparatus 122 has a hook which operably engages eye loop 152 integrated within the dust collection bag providing vertical support to the dust collection bag and maintaining the dust collection bag in an open position. Support apparatus 122 is a fixed length rod, alternately, it may be a telescopically adjustable rod. Other means and materials capable of providing vertical support to the dust bag may be employed as contemplated by one of ordinary skill in the art without departing from the scope and spirit of the present invention.

Figure 6:
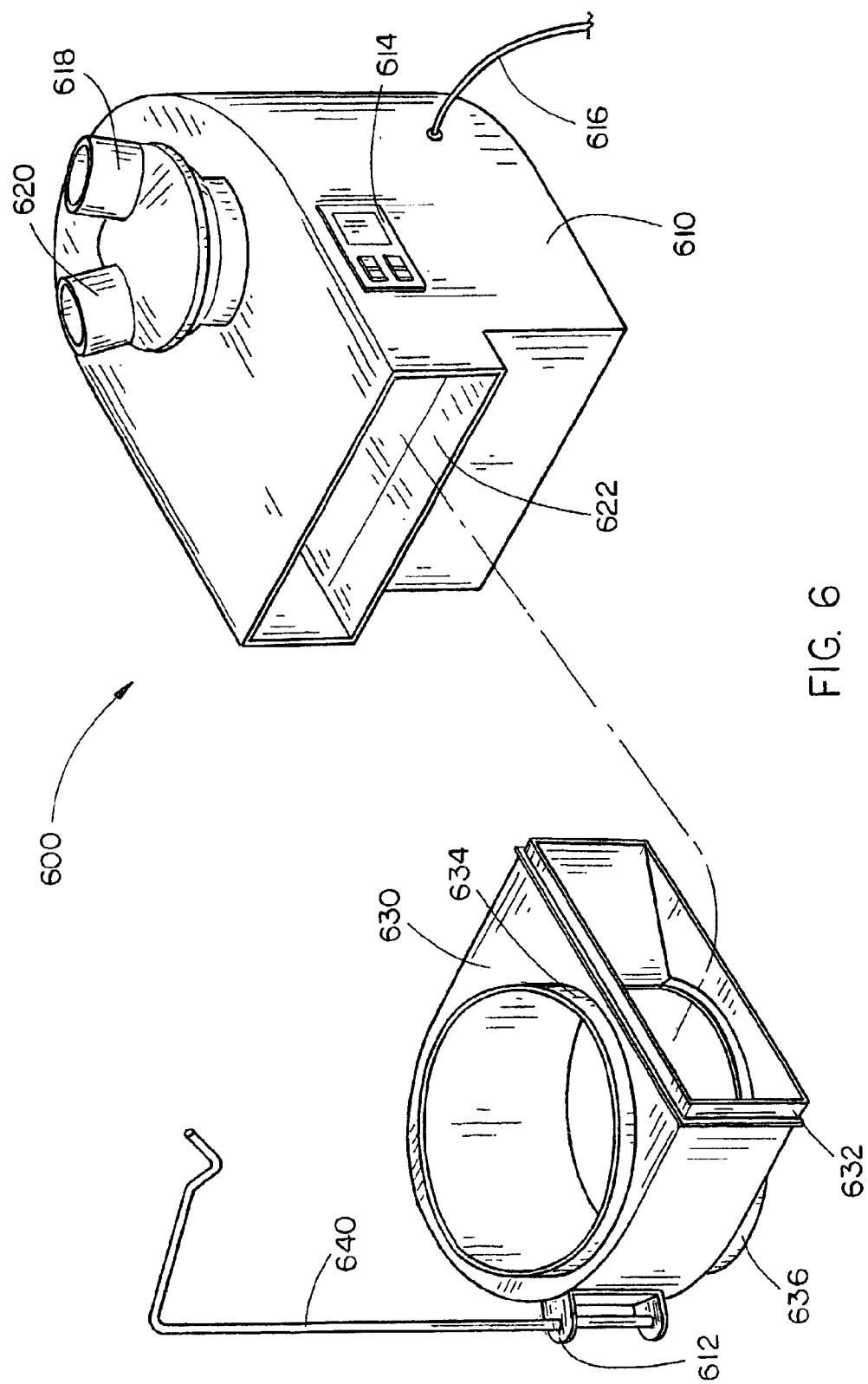
FIG. 6 is an isometric view illustrating the dust collection cabinet providing a two piece dust collection system with a removeable mounting device.

FIG. 6 is an illustration of a two piece dust collection device system 600. A housing 610 includes a motor, an on/off switch 614, a power cord 616, inlet gates 618 and 620 and outlet gate 622 in accord with the above described embodiments. A mounting device 630 includes a sleeve 632, which connects to outlet gate 622 of housing 610, storage facility connectors 634 and 636, which connect storage facilities as described in FIGS. 1 through 4 and a support apparatus 640, which is connected to mounting device 630 by mounting bracket 612. Mounting device 630 is removably operable with housing 610 to form a complete dust collection device system 600. Mounting device 630 may be further connected to housing 610 by fasteners, brackets or the like. Dust collection device system 600 may be mounted upon a cabinet as contemplated in the previous embodiments illustrated in FIGS. 1 through 5, and mounting device 630, upon disconnection with housing 610, may be stored within the cabinet.

Figure 7:
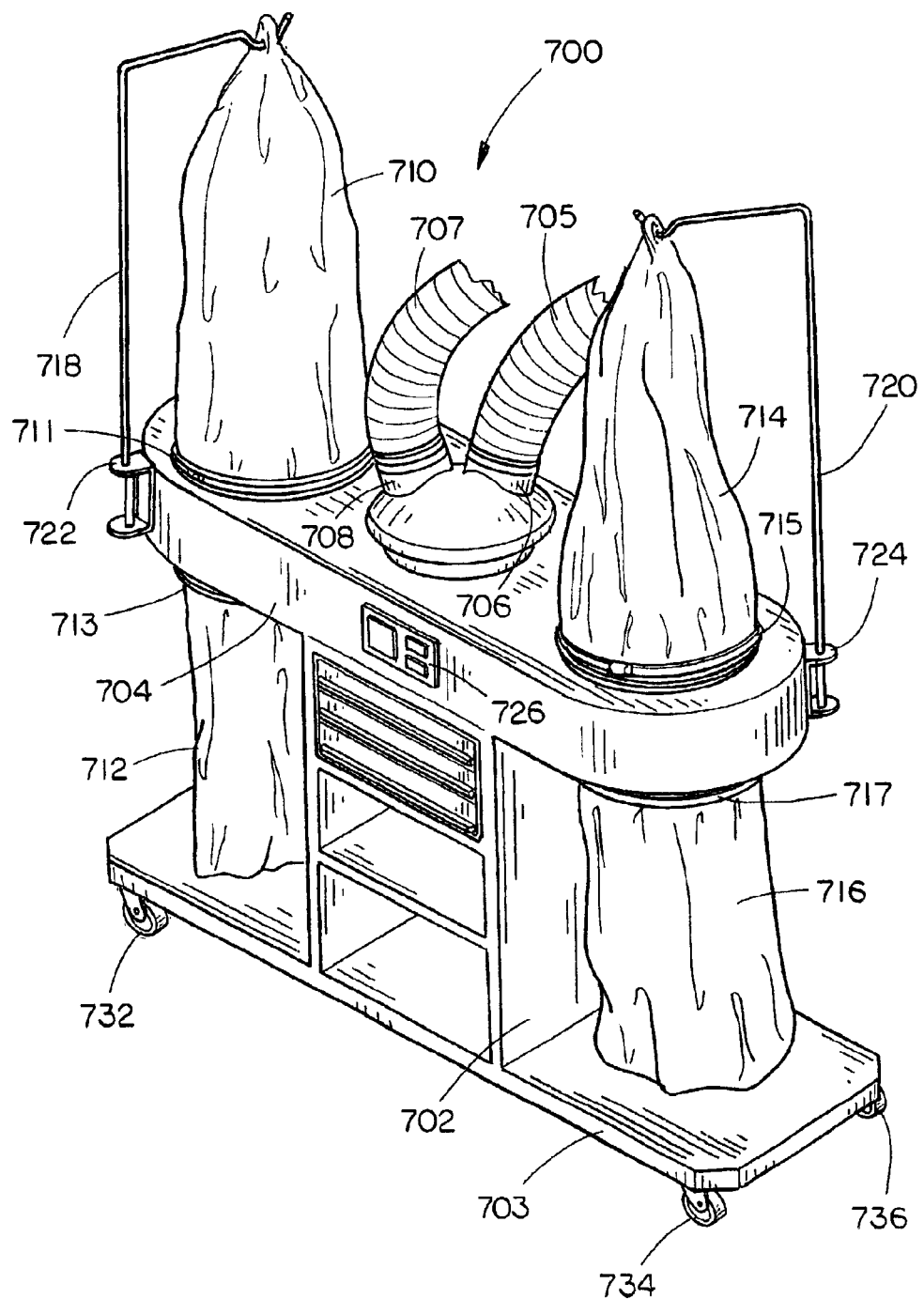
FIG. 7 is an isometric view illustrating the dust collection cabinet providing a plurality of storage facilities in accordance with an exemplary embodiment of the present invention.

Referring to FIG. 7, a dust collection cabinet 700 including a cabinet 702 mounted upon a platform 703 and a dust collection device housing 704 mounted upon cabinet 702, is shown. Cabinet 702 is of the similar description as illustrated in FIGS. 1 through 5. Platform 703 is large enough to extend beyond both sides of cabinet 702 to provide support to cabinet 702 and multiple storage facilities. Platform 703 is enabled with four casters 732, 734, 736 and 738 (caster 738 is not shown) and are operable as previously described in FIGS. 1 through 5. Dust collection device housing 704 includes a motor and inlet gates 706 and 708 connecting vacuum hoses 705 and 707. The connection of vacuum hoses 705 and 707 is through the same methods as previously described for FIGS. 1 though 5. Dust collection device housing 704 is connected to a plurality of storage facilities 710, 712, 714 and 716 through connectors 711, 713, 715 and 717 as previously described in FIGS. 1 through 5. Dust collection device housing 704 further includes support apparatus 718 and 720, mounting brackets 722 and 724 and an on/off switch 726. Two outlet gates (not shown but included within housing 704) connect storage facilities 710 through 716 to inlet gates 706 and 708. Storage facilities 710 through 716 may be dust bags, dust cans and the like as previously described in FIGS. 1 through 5. Alternately, cabinet 702 may be placed on one side of platform 703 with multiple storage facilities located on one side of cabinet 702.

Figure 8:
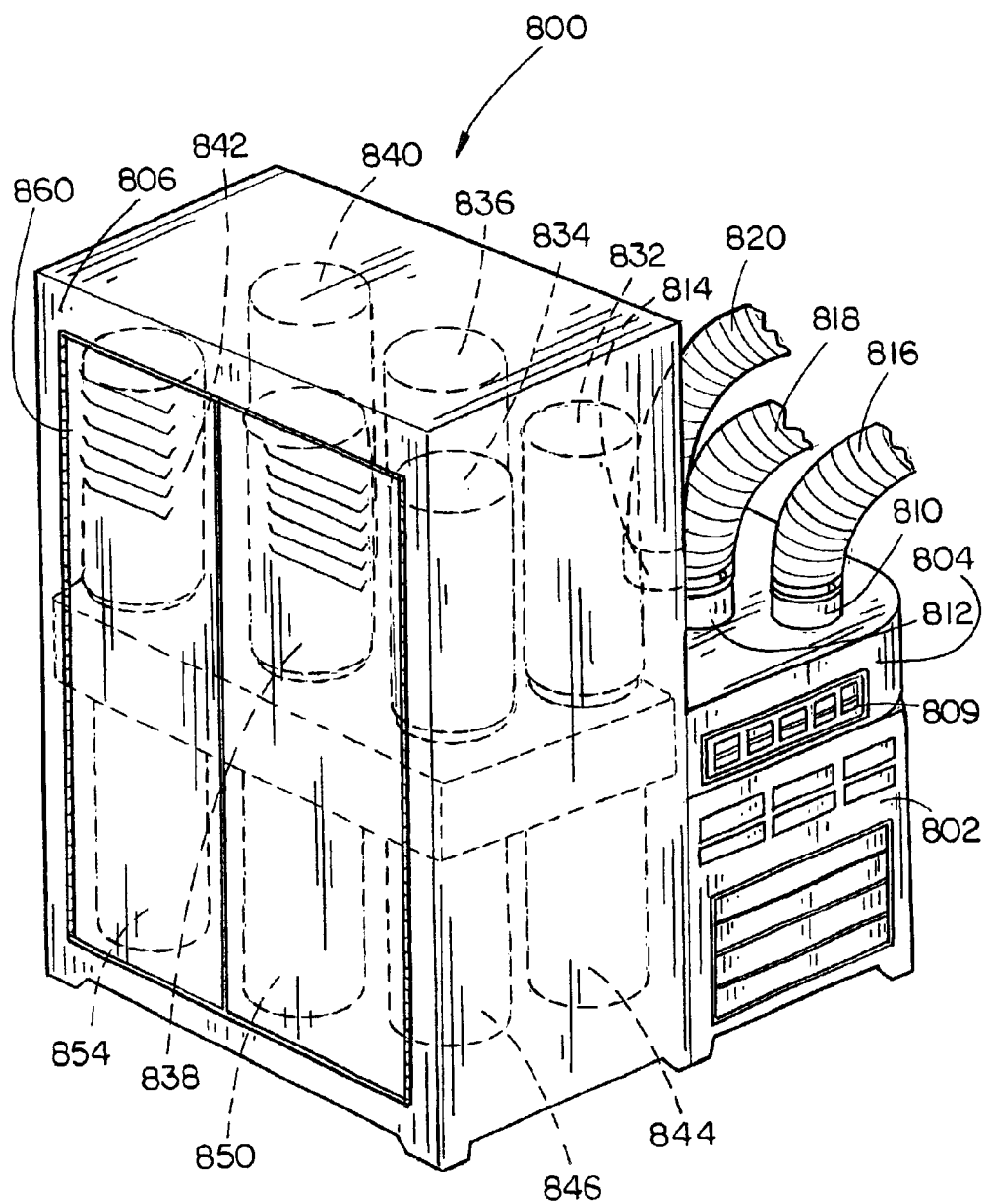
FIG. 8 is an isometric view illustrating the dust collection cabinet providing a storage facility cabinet enclosing the plurality of storage facilities in accordance with an exemplary embodiment of the present invention

Referring to FIG. 8 a dust collection cabinet 800 is shown, including a cabinet 802, a dust collection device housing 804 mounted upon cabinet 802 and a storage closet 806. Dust collection device housing 804 includes a motor, an on/off switch 809, a plurality of inlet gates 810, 812 and 814 (inlet gate 814 is not shown) and a plurality of outlet gates (not shown in this illustration but similar to outlet gate shown in FIG. 2 and described previously). Inlet gates 810 through 814 connect with intake members 816, 818 and 820, respectively, fastening together in a manner similar to that previously described in FIGS. 1 through 5. Storage closet 806 includes storage facilities 832, 834, 836, 838, 840, 842, 844, 846, 848, 850, 852, 854 (848 and 852 are not shown). Storage facilities 832 through 854 are connected to the plurality of outlet gates, thus providing a connection to the plurality of inlet gates 810 through 814. Storage facilities 832 through 854 are entirely enclosed within storage closet 806. A door 860 is provided within storage closet 806 to allow access to storage facilities 832 through 854. Intake members, such as vacuum hoses or other such dust collection devices are attached to the plurality of inlet gates 810 through 814 through methods similar to those previously described.

Dust collection device housing 804 may include more than one motor to increase the effectiveness of the entire system. This may require the inclusion of more than one on/off switch for the motors as well as an increased number of inlet gates, intake members and outlet gates. Dust collection device 804 may be removably mounted upon cabinet 802 as previously described in FIGS. 1 through 5. Cabinet 802 includes a plurality of shelves and drawers and it is contemplated that cabinet 802 may contain additional shelves, drawers and other storage means throughout the length of the cabinet.

It is believed that the dust collection device of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. A dust collection cabinet, comprising:
   a cabinet for providing storage; and
   a dust collection device disposed upon the cabinet, the dust collection device including a housing, wherein the housing further includes:
      a motor;
      an on/off switch disposed on the housing and connected to the motor;
      an inlet gate coupled to the motor, the inlet gate suitable for providing vacuuming power from the motor for the collection of dust;
      an outlet gate coupled to the motor, the outlet gate suitable for moving the collected dust from the inlet gate;
      an impeller connected with the housing, the impeller for providing noise reduction and ventilation; and
      a storage facility connected to the housing and coupled with the outlet gate, the storage facility being suitable for providing storage of the collected dust received from the outlet gate,
   wherein the dust collection cabinet provides storage for work accessories as well as dust collection and storage capabilities.

2. The dust collection cabinet of claim 1, wherein the dust collection cabinet further includes a platform upon which the cabinet is disposed, the platform providing a base for the dust collection cabinet.

3. The dust collection cabinet of claim 2, wherein the platform is disposed with a plurality of casters to provide a mobile base for the dust collection cabinet.

4. The dust collection cabinet of claim 3, wherein the casters are disposed with looking mechanisms to enable an operator to fix the location of the dust collection cabinet.

5. The dust collection cabinet of claim 2, wherein the cabinet is removable from the platform.

6. The dust collection cabinet of claim 1, wherein the cabinet includes at least one of a drawer and a shelf.

7. The dust collection cabinet of claim 1, wherein the dust collection device is removable from the cabinet.

8. The dust collection cabinet of claim 1, wherein the dust collection device, further comprises:
   a support apparatus connected to the housing and the storage facility, the support apparatus being suitable for maintaining the storage facility in an open position; and
   an intake member connected to the inlet gate, the intake member being suitable for the collection of dust.

9. The dust collection cabinet of claim 8, wherein the intake member is a vacuum hose connected to the inlet gate of the dust collection device.

10. The dust collection cabinet of claim 1, wherein the storage facility is at least one of a dust bag and a dust can.

11. The dust collection cabinet of claim 10, wherein the storage facility is disposed within a storage closet.

12. The dust collection cabinet of claim 1, wherein the dust collection device includes a mounting bracket, the mounting bracket being suitable for mounting the dust collection device to a stationary object.

13. The dust collection cabinet of claim 1, wherein the dust collection device is a two piece system including a housing member and a mounting member which are removable from one another.

14. A dust collection cabinet, comprising:
   a cabinet including at least one of a shelf and a drawer, the cabinet being suitable for providing storage; and a dust collection device disposed upon the cabinet, the dust collection device including a housing, wherein the housing further includes:
  a motor;
  an on/off switch disposed on the housing and connected to the motor;
  an inlet gate coupled to the motor, the inlet gate suitable for providing vacuuming power from the motor for the collection of dust;
  an outlet gate coupled to the motor, the outlet gate suitable for moving the collected dust from the inlet gate;
  an impeller connected with the housing, the impeller for providing noise reduction and ventilation; and
  a storage facility connected to the housing and coupled with the outlet gate, the storage facility being suitable for providing storage of the collected dust received from the outlet gate,
wherein the dust collection cabinet provides storage for work accessories as well as dust collection and storage capabilities.

15. The dust collection cabinet of claim 14, wherein the dust collection cabinet further includes a platform upon which the cabinet is disposed, the platform providing a base for the dust collection cabinet.

16. The dust collection cabinet of claim 15, wherein the platform is disposed with a plurality of casters to provide a mobile base for the dust collection cabinet.

17. The dust collection cabinet of claim 16, wherein the casters are disposed with locking mechanisms to enable an operator to fix the location of the dust collection cabinet.

18. The dust collection cabinet of claim 15, wherein the cabinet is removable from the platform.

19. The dust collection cabinet of claim 14, wherein the dust collection device is removable from the cabinet.

20. The dust collection cabinet of claim 14, wherein the housing further comprises:
  an intake member connected to the inlet gate, the intake member suitable for providing the collection of dust;
  a support apparatus connected to the housing and coupled with the storage facility, the support apparatus being suitable for maintaining the storage facility in an open position; and
  a power source connected to the motor.

21. The dust collection device of claim 20, wherein the intake member is a vacuum hose connected to the inlet gate of the dust collection device.

22. The dust collection cabinet of claim 14, wherein the storage facility is at least one of a dust bag and a dust can.

23. The dust collection cabinet of claim 22, wherein the storage facility is disposed within a storage closet.

24. The dust collection cabinet of claim 14, wherein the dust collection device includes a mounting bracket, the mounting bracket being suitable for mounting the dust collection device to a stationary object.

25. The dust collection cabinet of claim 14, wherein the dust collection device is a two piece system including a housing member and a mounting member which are removable from one another.

26. A dust collection cabinet, comprising:
  a platform providing a base for the dust collection cabinet;
  a cabinet, including at least one of a shelf and a drawer, disposed on the platform, the cabinet being suitable for providing storage; and
  a dust collection device disposed upon the cabinet, the dust collection device being suitable for providing dust collection and storage, further comprising:
    a housing, wherein the housing is disposed with:
      a motor for providing power;
      an on/off switch disposed on the cabinet and connected to the motor;
      an inlet gate coupled to the motor, the inlet gate suitable for providing vacuuming power from the motor for the collection of dust;
      an outlet gate coupled to the motor, the outlet gate being suitable for moving the collected dust from the inlet gate;
      an impeller for providing noise reduction and ventilation;
    an intake member connected to the inlet gate, the intake member suitable for providing the collection of dust;
    a storage facility disposed within a storage closet, coupled with the outlet gate, the storage facility is suitable for receiving the collected dust from the outlet gate and providing storage of the collected dust;
    a support apparatus connected to the housing and coupled with the storage facility, the support apparatus being suitable for maintaining the storage facility in an open position; and
    a power source connected to the motor,
wherein the dust collection cabinet provides storage for work accessories as well as dust collection and storage capabilities.

27. The dust collection cabinet of claim 26, wherein the platform is:
  disposed with a plurality of casters to provide a mobile base for the dust collection cabinet.

28. The dust collection cabinet of claim 27, wherein the casters are disposed with locking mechanisms to enable an operator to fix the location of the dust collection cabinet.

29. The dust collection cabinet of claim 26, wherein the cabinet is removable from the platform.

30. The dust collection cabinet of claim 26, wherein the dust collection device is removable from the cabinet.

31. The dust collection cabinet of claim 26, wherein the intake member is a vacuum hose connected to the inlet gate of the dust collection device.

32. The dust collection cabinet of claim 26, wherein the storage facility is at least one of a dust bag and a dust can.

33. The dust collection cabinet of claim 26, wherein the dust collection device includes a mounting bracket, the mounting bracket being suitable for mounting the dust collection device to a stationary object.

34. The dust collection cabinet of claim 26, wherein the dust collection device is a two piece system including a housing member and a mounting member which are removable from one another.

35. A dust collection cabinet, comprising:
  a cabinet for providing storage;
  a platform connected with the cabinet, the platform including a plurality of casters; and
  a dust collection device disposed upon the cabinet, the dust collection device including a housing, wherein the housing further includes:
    a motor;
    an on/off switch disposed on the housing and connected to the motor;
    an inlet gate coupled to the motor, the inlet gate suitable for providing vacuuming power from the motor for the collection of dust;
    an outlet gate coupled to the motor, the outlet gate suitable for moving the collected dust from the inlet gate;
    an impeller connected with the housing, the impeller for providing noise reduction and ventilation;

a storage facility connected to the housing and coupled with the outlet gate, the storage facility being suitable for providing storage of the collected dust received from the outlet gate; and a support apparatus connected to the housing and coupled with the storage facility, the support apparatus being suitable for maintaining the storage facility in an open position;

wherein the dust collection cabinet provides storage for work accessories as well as dust collection and storage capabilities.

36. The dust collection cabinet of claim 35, wherein the cabinet is removable from the platform.

37. A dust collection cabinet, comprising:

a cabinet including at least one of a shelf and a drawer, the cabinet being suitable for providing storage;

a platform connected with the cabinet, the platform including a plurality of casters; and a dust collection device disposed upon the cabinet, the dust collection device including a housing, wherein the housing further includes:

a motor;

an on/off switch disposed on the housing and connected to the motor;

an inlet gate coupled to the motor, the inlet gate suitable for providing vacuuming power from the motor for the collection of dust;

an outlet gate coupled to the motor, the outlet gate suitable for moving the collected dust from the inlet gate;

an impeller connected with the housing, the impeller for providing noise reduction and ventilation;

a storage facility connected to the housing and coupled with the outlet gate, the storage facility being suitable for providing storage of the collected dust received from the outlet gate; and a support apparatus connected to the housing and coupled with the storage facility, the support apparatus being suitable for maintaining the storage facility in an open position;

wherein the dust collection cabinet provides storage for work accessories as well as dust collection and storage capabilities.

38. The dust collection cabinet of claim 37, wherein the cabinet is removable from the platform.

* * * * *